June 7, 1932.   J. R. FITZGERALD   1,862,473
PRESSURE OPERATED SWITCH
Filed April 5, 1930   2 Sheets-Sheet 1
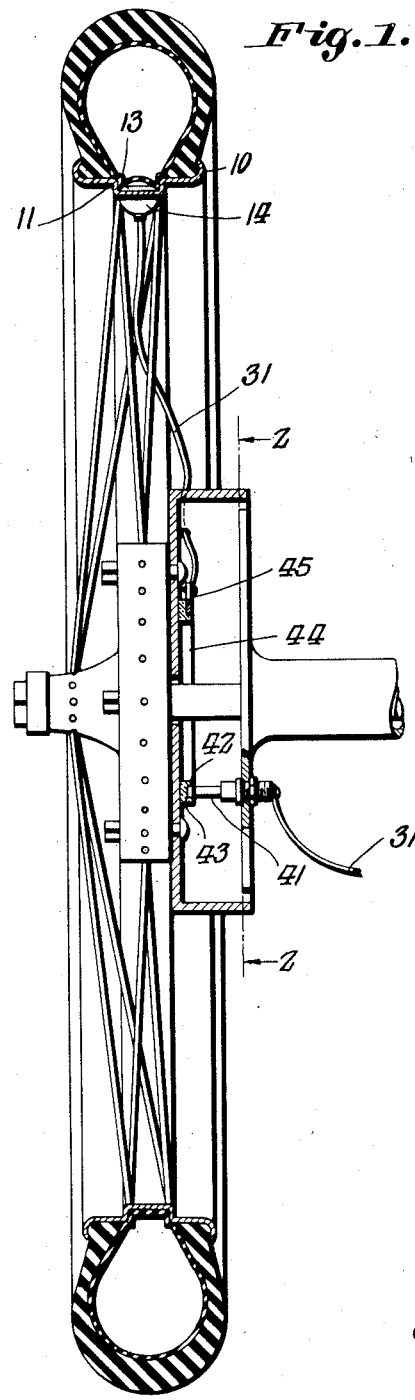
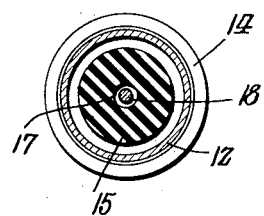
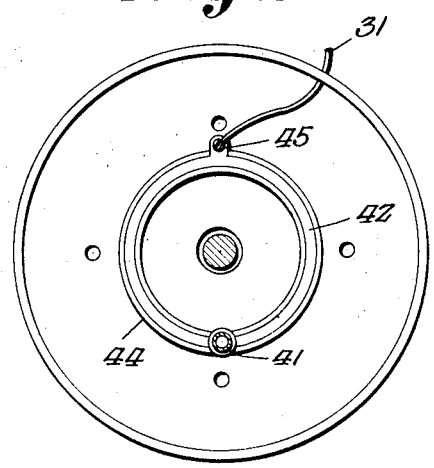
J. R. Fitzgerald,
INVENTOR
BY Victor J. Evans
ATTORNEY June 7, 1932.  J. R. FITZGERALD  1,862,473
PRESSURE OPERATED SWITCH
Filed April 5, 1930   2 Sheets-Sheet 2
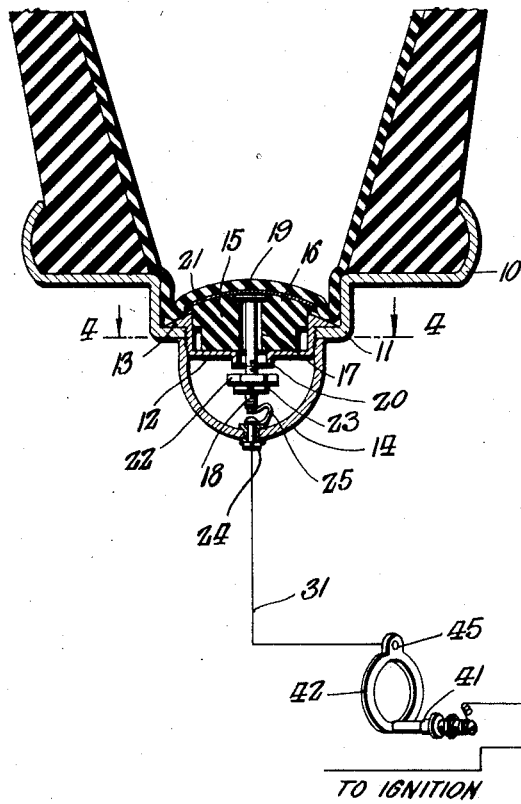
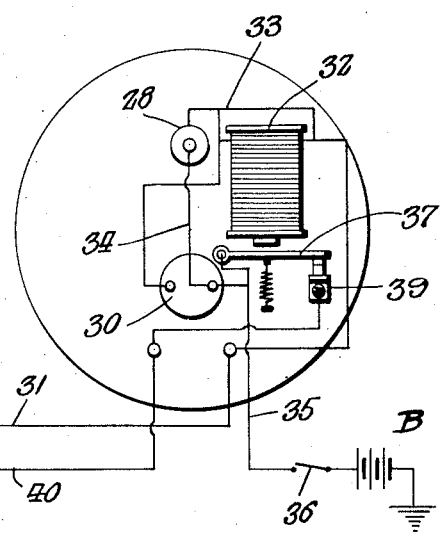
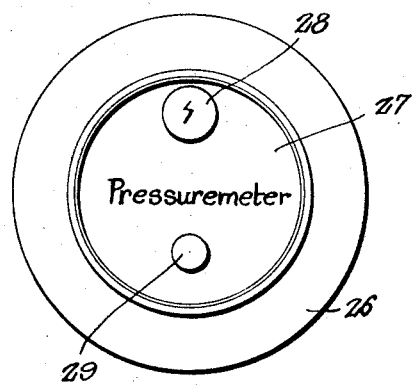
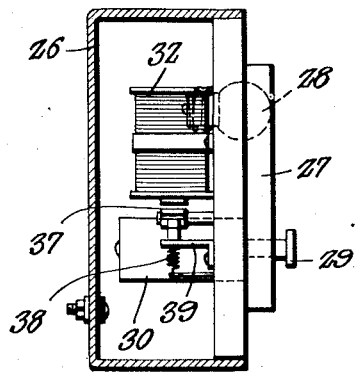
J. R. Fitzgerald,
INVENTOR
BY Victor J. Evans
ATTORNEY Patented June 7, 1932

1,862,473

UNITED STATES PATENT OFFICE

JOHN R. FITZGERALD, OF HARLINGEN, TEXAS, ASSIGNOR OF ONE-EIGHTH TO ORVILLE F. BAKHAUS, OF CASTLE, OKLAHOMA

PRESSURE OPERATED SWITCH

Application filed April 5, 1930. Serial No. 441,895.

This invention relates to indicators of a design and nature primarily applicable for use upon and in conjunction with motor vehicles to warn the driver of the state or condition of the tires.

An object of the invention is to provide simple and efficient means for indicating when the pressure in the inner-tube of the tire of the vehicle has fallen below normal, and with this object in view, the structure includes in combination with the tire and wheel rim a cup-shaped member and a compressible cushion member engageable by the tube. A sleeve is carried by the cup-shaped member and a shaft passes through said sleeve. A contact nut is carried by the shaft and the cup-shaped member is provided with a closure cap. A companion contact member is carried by the closure cap and is provided with a flexible conductive connection with said shaft.

With the above and other objects in view, the invention further consists of the following novel features and details of construction, to be hereinafter more fully described, illustrated in the accompanying drawings and pointed out in the appended claim.

In the drawings:

Figure 1 is a vertical sectional view taken through a motor vehicle wheel and tire construction illustrating the relative arrangement of the circuit closing device and transmitting mechanism therefor.

Figure 2 is a sectional view taken on line 2—2 of Figure 1.

Figure 3 is a diagrammatic plan view, including the circuit closing device in section, showing the particular wiring circuit of the elements comprising the invention.

Figure 4 is a horizontal sectional view taken on line 4—4 of Figure 3.

Figure 5 is a front elevation of the instrument showing the pilot light and the control knob for the cut-out switch for the ignition circuit disturbing mechanism.

Figure 6 is a vertical sectional view taken through the instrument housing.

Referring to the drawings in detail wherein like characters of reference denote corresponding parts, the reference character 10 indicates generally a form of tire rim shown provided with a central groove portion 11 or which may be classified in other terms as a "drop center tire rim". It is to be understood that the conventional forms of clincher, straight side and balloon tire forms of rims may be employed to equal effect when the cut-out mechanism is applied incurring such alterations in the installation thereof as may require the exercise of mechanical skill.

The circuit closing mechanism, alluded to in the foregoing, comprises a cup-shaped member 12 having an annular flange 13 reposing upon the outer surface and bottom wall of the central channel or drop center of the rim proper whereas the remaining portion of the cup-shaped member is passed through and threaded within an opening in the aforementioned portion of the rim in the manner suggested in Figure 3 of the drawings. The protruding exteriorly threaded portion of the cup-shaped member is designed to telescopically associate the open end of a closure cap 14 therewith for purposes to be better understood in the following description of the invention.

A compressible element or cushion member, such as indicated at 15, preferably composed of soft or sponge rubber is disposed within the cup-shaped member 12 and is provided with a rounded outer surface 16 projected without the aforementioned cup-shaped member. The compressible element is provided with a central bore 17 to loosely accommodate the shank of a bolt or shaft 18 having a head 19 upon one end reposing upon the upper curved surface 16 of the compressible element whereas the major portion of the shank protrudes through a sleeve portion 20 provided in the bottom wall of the cup-shaped member. A layer or lining of material, such as indicated at 21, is interposed between the head 19 of the shank 18 and the immediate portion of the vehicle tire innertube whereby the latter will not be overworked through contact with the head 19 alone. It will, of course, be understood that if a flap is used with the tube this flap would contact the lining 21.

A contact nut 22 adjustably mounted upon the shank 18 and normally disposed in spaced relation to the adjacent peripheral edge of the sleeve 20 through the instrumentality of a jam nut 23 is designed to make and break the indicator circuit in accordance with the inflation of the particular tire. A contact member 24 carried by and insulated from the closure cap 14 is connected at one end with the shank 18 through the instrumentality of a wire 25.

The indicating or indicator instrument housing, such as indicated at 26, is provided with a cover plate 27 having openings through which a pilot light 28 is exposed and the handle or control knob 29 of a cut-out switch 30 is projected. The circuit between the circuit closing element and the instrument is effected through the employment of a conducting wire 31 having connection at its opposite end with an electro-magnet 32. Said circuit also includes in series a form of rotary contact construction to be better understood in the following description of the invention. The pilot light 28 is operated through the same circuit incident to the connecting of a wire 33 with the wire 31 in the manner shown in Figure 3. The other side of the pilot lamp circuit is completed through a conducting wire 34 leading to the cut-out switch 30 and subsequently through a wire 35 to a master control switch 36 controlling the flow of electrical energy to the aforementioned circuit from the vehicle battery B.

A movable contact member 37 is joined or otherwise connected at its pivoted end with the wire 35 whereas its opposite end is normally induced for yielding contacting engagement, through the employment of a retractile spring 38 with a stationary contact 39 located in the path of movement thereof. The movable contact member 37 is preferably located at right angles to the core of the electro-magnet or solenoid 32. The stationary contact member 39 has a conducting wire 40 associated therewith leading to the ignition lock or circuit of the particular vehicle.

It has been found necessary to incorporate or otherwise include a form of rotary contact whereby a normally open circuit must be constantly maintained between the circuit closer and instrument regardless of the condition of the tire innertube. The aforementioned structure comprises an adjustably mounted spring tensioned contact member 41 having yielding wiping contact with an annular contact or ring 42 preferably disposed within the channel 43 of an insulator 44 concentrically arranged of the vehicle axle within the brake drum of the wheel substantially as illustrated in Figure 1 of the drawings. The wire 31 leading from the circuit closing device is connected with an ear 45 projecting outwardly and beyond that portion of the ring 42 having electrical connection with the contact member 41 whereby the normally open circuit between the circuit closing device and instrument will be maintained through the revolving wheel.

The invention is susceptible of various changes in its form, proportions and minor details of construction, and the right is herein reserved to make such changes as properly fall within the scope of the appended claim.

Having described the invention, what is claimed is:—

A switch element for pneumatic tires comprising a cup-shaped member carried by the tire rim adjacent the tube therefor, a compressible cushion member seated within the cup-shaped member and engageable with the tube, a sleeve carried by and outwardly projecting from the bottom wall of the cup-shaped member, a shaft carried by and operable with said cushion member and projecting through said sleeve, a contact nut carried by the shaft for selective contacting engagement with the sleeve, a closure cap for the cup-shaped member housing the projecting portion of the shaft and contact member, and a companion contact member carried by and insulated from the closure cap having flexible conductive connection with the extended portion of said shaft.

In testimony whereof I affix my signature.

JOHN R. FITZGERALD.